United States Patent [19]
Motley et al.

[11] Patent Number: 5,511,467
[45] Date of Patent: Apr. 30, 1996

[54] STEAM TABLE PAN HANDLING APPARATUS

[76] Inventors: Daniel L. Motley, 102 Andover, Victoria, Tex. 77904; Joseph P. Petrisky, Jr., Rte. 1, Box 329 C, Port Lavaca, Tex. 77979; Gordon L. Genty, 121 Scarborough, Victoria, Tex. 77901

[21] Appl. No.: 187,657

[22] Filed: Jan. 26, 1994

Related U.S. Application Data

[63] Continuation-in-part of Ser. No. 885,192, May 19, 1992, abandoned.

[51] Int. Cl.⁶ ................................ A47J 43/00
[52] U.S. Cl. ................ 99/426; 99/449; 211/181; 220/743; 220/756; 294/32
[58] Field of Search ............... 99/426, 433, 427, 99/449, 645, 339, 340, 456; 220/405, 491, 646, 743, 756, 769, 912; 211/181, 195, 201; 248/175; 294/32, 34

[56] References Cited

U.S. PATENT DOCUMENTS

| | | | |
|---|---|---|---|
| 340,152 | 4/1886 | Perry | 99/433 |
| 2,506,928 | 5/1950 | Klingbiel | 99/433 |
| 2,824,510 | 2/1958 | Gangwer | 99/426 |
| 3,194,429 | 7/1965 | Bouet | 99/449 |
| 3,365,071 | 1/1968 | Ottinger | 99/426 |
| 4,718,402 | 1/1988 | Fordyce | 99/426 |
| 5,203,254 | 4/1993 | Fletcher | 99/426 |
| 5,287,800 | 2/1994 | Orednick | 99/449 |
| 5,339,728 | 8/1994 | Marchwiak et al. | 99/426 |

FOREIGN PATENT DOCUMENTS 2449482  4/1975  Germany ........................ 99/433

Primary Examiner—David Scherbel
Assistant Examiner—James F. Hook
Attorney, Agent, or Firm—Neil F. Markva

[57] ABSTRACT

Applicants' invention comprises an apparatus for safely yet effectively handling steam table pans. The apparatus is a frame formed from cylindrical steel of a shape and size for surrounding a steam table pan under its lateral flange. The frame includes two handles positioned so as not to interfere with proper seating of the pan in the receptacle hole in the steam table. One embodiment of the pan handling device includes lid/pan clamps for securing the pan handling device to a steam table pan as well as for securing a pan lid to a pan such as when food is to be stored in a pan.

19 Claims, 3 Drawing Sheets

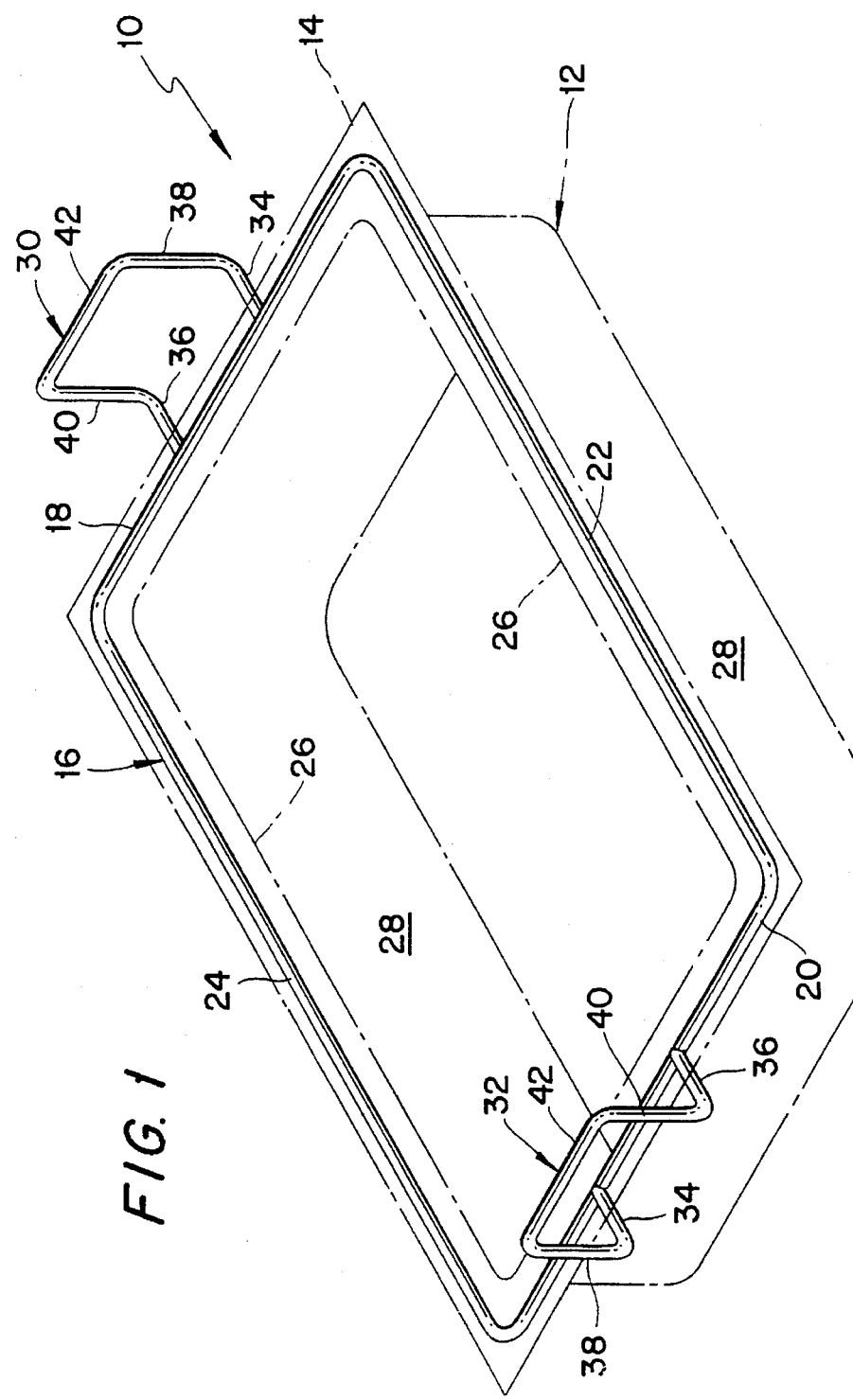
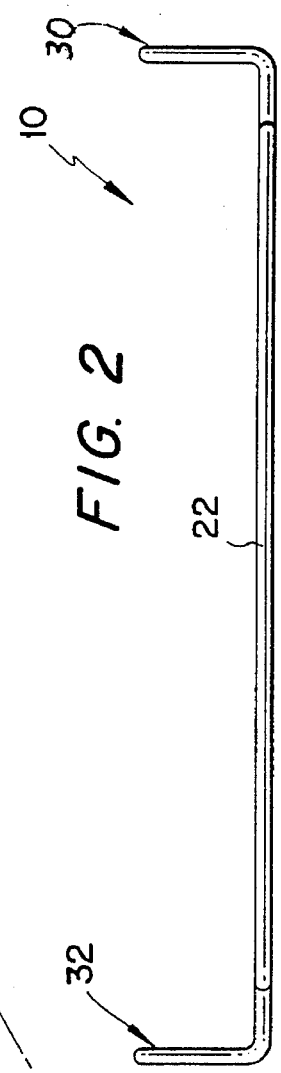

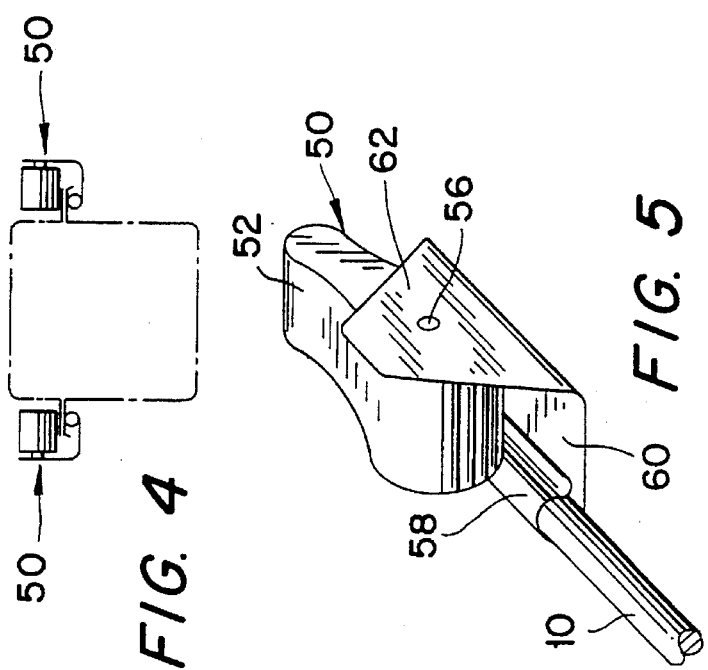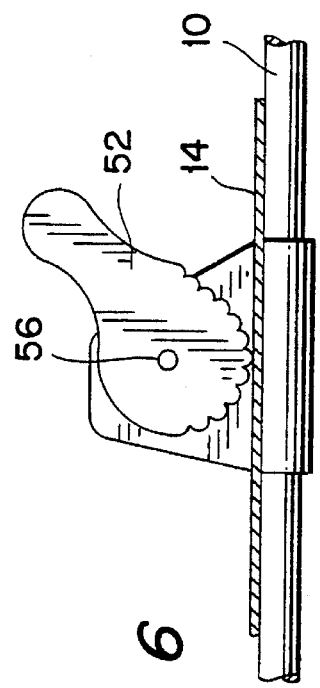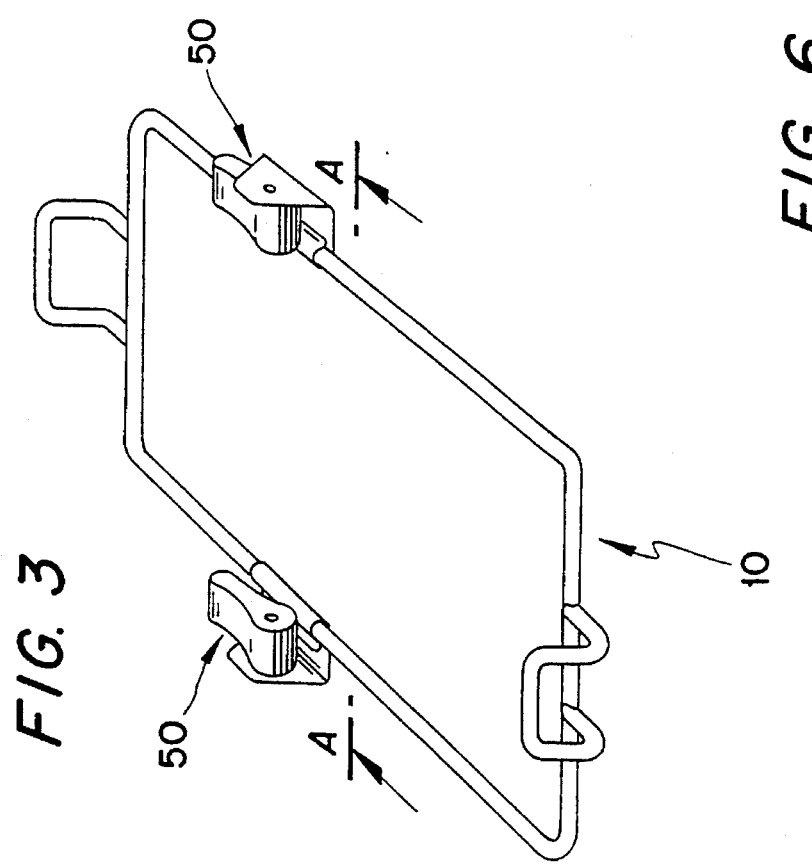

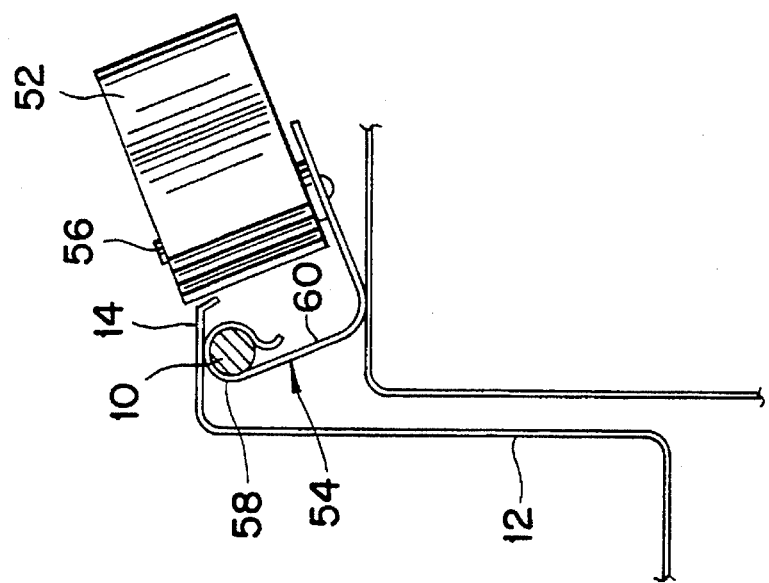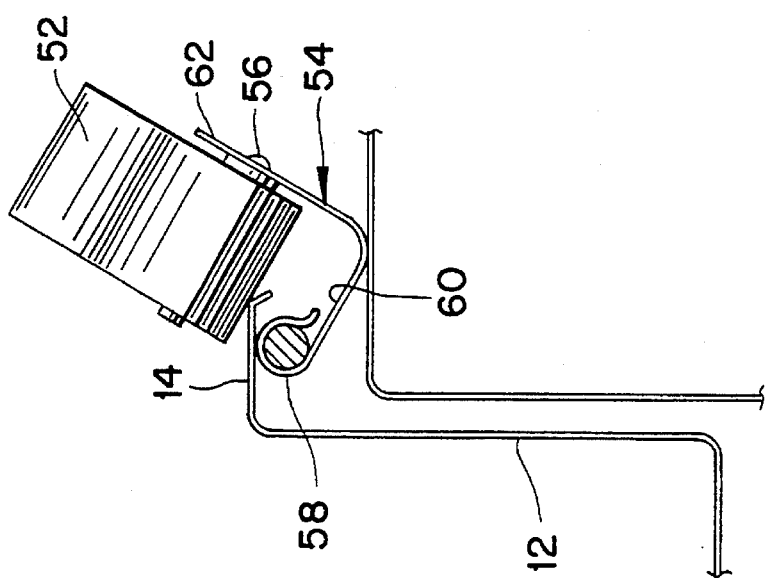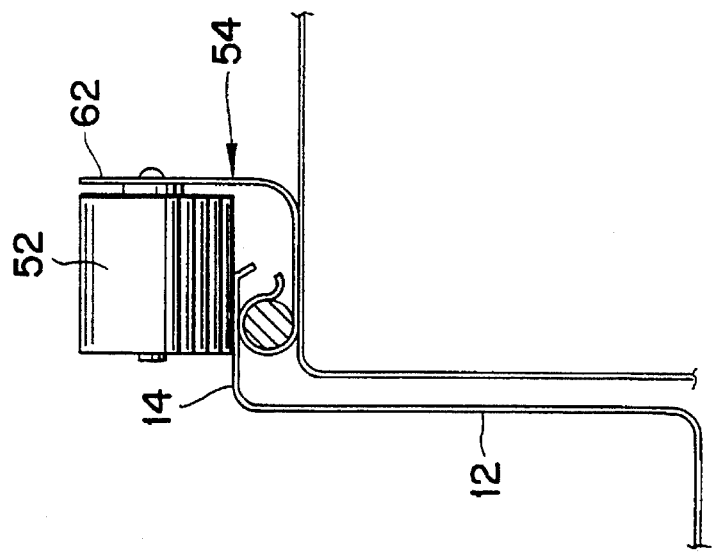

STEAM TABLE PAN HANDLING APPARATUS

CITATION TO PRIOR APPLICATION

This is a continuation-in-part application from U.S. patent application Ser. No. 07/885,192 filed May 5, 1992 now abandoned.

FIELD OF THE INVENTION

Applicants' invention relates to tools and utensils used in conjunction with the cooking and serving of food, particularly in a commercial context.

BACKGROUND OF THE INVENTION

Cafeterias everywhere use steam tables with removable pans as the means for keeping foods hot for serving. Steam tables essentially include an elongate reservoir of heated water with a table top cover running the length of the reservoir.

Holes, usually rectangular, are formed at intervals along the length of the cover. Sized and shaped for being partially received into these holes are steam table pans. These known pans have an inside recess for containing foods, an outside surface profile that registers with the pan-receiving holes, and include a flange at their upper margins. When a steam table pan is disposed in a pan-receiving hole, the flange rests against the cover of the steam table top cover along the edge portion of the pan-receiving hole while the remainder (outside surface profile) of the pan extends through the pan-receiving hole one in the cover to closely approach or contact the heated water below.

To contain steam within the confines of the steam table, the flange of a steam table pan is designed to lie substantially flat on the surface of the steam table cover. This makes removing such a pan from a steam table very difficult.

Some workers use knife edges to pry pans from their positions in the steam table cover. Such an approach carries obvious risks of injury. Other workers are known to pry the pan from its position using their fingernails. The problem with this latter approach is that once the seal is breached between the flange of the pan and the steam table cover, steam is quickly released thereby tending to burn the worker's fingers.

Also, because of the absence of space between the pan flange and the steam table cover when the pan is in position, placing a steam table pan into position usually involves a worker releasing the pan from his/her grasp and allowing it to fall into position. This can result in heated food splashing onto a worker, again burning the worker, or splashing into neighboring pans thereby contaminating the food therein.

A still further problem relates to the lack of handles on typical steam table pans. Workers charged with conveying steam table pans between the cooking and serving areas are known to use various means for handling these pans. Some use rags as potholders—rags which may be soiled in such a manner as to risk contaminating the food in the pan. Other workers use pliers or like tools to grasp the pan flanges—tools which are not truly suited for securely grasping such pans and which, in addition to presenting a working environment with the risks associated with dropping a pan filled with hot food, tend to damage the pans. Further still, such tools are prone to contamination from accumulated food and tend to disappear from the work place due to their utility outside of the work place. The latter problem increases operating costs to cafeteria management.

Problems associated with a lack of handles on steam table pans are not, as a practical matter, solved by simply adding handles. Not only would adding handles greatly increase the space consumed by a stack of pans (because of the position required to avoid interference with the nesting relationship between the pan and the steam table cover), they would significantly increase the cost of pans.

The food service industry has experienced, and is experiencing a long-felt need for an apparatus for safely and easily handling steam table pans. Such an apparatus would be one which is effective for its intended purpose, but which has little, if any, utility in the other contexts. The apparatus is also one which is easily separable from the pans while still providing fail-safe grasping of the pans during use. Still further, the apparatus should be easily cleaned and relatively inexpensive to make or purchase.

PURPOSE OF THE INVENTION

It is an object of the present invention to provide a novel device for safely handling steam table pans.

It is another object of the present invention to provide a novel apparatus for securely grasping steam table pans without damaging such pans.

It is another object of the present invention to provide a novel device for obviating the need for using cloths in handling hot steam table pans.

It is another object of the present invention to provide an apparatus for handling steam table pans which apparatus securely grasps such pans during use, but is easily removed therefrom afterwards.

It is another object of the present invention to provide an apparatus for use in handling steam table pans which apparatus is useful in a manner which reduces likelihood of injury to workers.

It is another object of the present invention to provide a device for handling steam table pans which reduces likelihood of food spillage.

Summary of the Invention

Applicants' present invention is directed to a steam table pan handling apparatus. The apparatus, herein called a "pan handler", is designed to circumvent a steam table pan in the plane defined by the pan's upper margin (upper margin plane) and, when in use, lodge under at least a portion of the pan's flange. The pan handler exhibits a handle on each of two opposing sides.

The device of the invention is for handling a steam table pan having an inside recess for containing food, an outside surface profile, and an outwardly projecting flange that resets against a steam table top cover along the edge portion of a table pan-receiving hole when the outside surface profile of the steam table pan is registered with and disposed in the steam table pan-receiving hole.

The device comprises table pan supporting means located along the outside surface profile of the steam table pan and below the outwardly projecting flange for carrying the steam table pan. The table pan supporting means is located between the outwardly projecting flange of the steam table pan and the steam table top cover along the edge portion of the steam table pan-receiving hole when the steam table pan is disposed in the steam table pan-receiving hole. First and second handle means are connected to respective opposing sides of the table pan supporting means for lowering the steam table pan into and lifting the table pan out of a steam table pan-receiving hole.

The table pan supporting means is removably disposable around the outside surface profile of the steam table pan and includes flange engaging surface means and steam table cover engaging means. The flange engaging surface means is located on one side of the table pan supporting means for contiguously supporting the outwardly projecting flange of the steam table pan. The steam table cover engaging means is on another side of the table pan supporting means for resting on the steam table cover when the steam table pan is disposed within the table pan-receiving hole.

In a specific embodiment, the steam table pan has an upper margin defining an upper plane along the top of the inside surface of the steam table pan. The table pan supporting means is located within the upper margin plane and under at least a portion of the outwardly projecting flange. As a particular feature, the table pan supporting means includes a frame structure defining a frame structure plane. The first an second handle means each includes coupling segments fixedly secured at one end thereof to the frame structure, and the coupling segments are located within the frame structure plane and have upwardly directed grasping handle sections at the other end thereof.

In another embodiment clamping means is mounted to the table pan supporting means to securely engage the table pan supporting means to the steam table. The clamping means includes mounting bracket means pivotally attached to the pan supporting means. The mounting bracket means includes a cam lock support portion, a locking base portion, and a cam lock that is rotatably carried on the cam lock support portion to rotate between a locking position and an unlocked position.

Any embodiment of Applicants' invention permits its user to safely transport steam table pans, place the pans in position in the steam table, and later easily remove the pans for re-filling or cleaning.

BRIEF DESCRIPTION OF THE DRAWINGS

Other objects of this invention will appear in the following description and appended claims, reference being made to the specification wherein like reference characters designate corresponding parts in the several views.

FIG. 1 is a perspective view of one embodiment of Applicants' pan handling apparatus in operative position relative to a steam table pan.

FIG. 2 is an elevational view of the pan handler of FIG. 1.

FIG. 3 is a perspective view of an alternative embodiment of Applicants' pan handling apparatus with the addition of lid/pan clamps.

FIG. 4 is an elevational cross-sectional view of FIG. 3 along line A—A.

FIG. 5 is an enlarged perspective view of one pan/lid clamp attached to Applicants' pan handling apparatus.

FIG. 6 is a side elevational, partial cut-away view of a lid/pan clamp of Applicants' invention.

FIGS. 7a, 7b, and 7c depict the sequence of engaging Applicants' pan handling apparatus with lid/pan clamp to a steam table pan.

DETAILED DESCRIPTION OF THE INVENTION

As shown in to FIG. 1, the pan handler or pan supporting means, generally designated 10 extends around the entire outer surface profile of steam table pan, generally designated 12, and contiguously supports the pan flange 14 when pan handler 10 is in use to lower and lift pan 12 into and out of a steam table opening (not shown).

The pan handler 10 includes a frame 16 consisting of a primary rail 18, a secondary rail 20, a primary cross member 22 and a secondary cross member 24. As shown, in the preferred embodiment these four members form an uninterrupted rectangular (or when appropriate, square) structure. In order to act essentially as a gasket between the steam table cover (not shown in the drawings) and the underside of the pan's flange, frame 16 is formed from metal stock which is substantially round in cross-section perpendicular to its length. Whatever the dimensions in the plane defined by the rectangle or square of the frame 16, the rails 18 and 20 and cross members 22 and 24 should be approximately ¼" in cross-sectional diameter. Such a dimension insures adequate stability of the pan handler 10, yet allows the pan 12 to sit low enough in the steam table so as to not appreciably change the normal position of the pan 12 relative to the heated water in the steam table.

For hygienic purposes, the clearly preferred material for the pan handler 10 is stainless steel. However, other materials, including heat resilient plastics, would work and would be less expensive.

The frame 16 should, by its interior margin, define a rectangle (or square) which is, in each of its two dimensions, only slightly larger than the like shape defined by the steam pan 12 at the upper margin 26 between its flange 14 and the walls 28 of its vessel portion. A differential in each dimension of approximately ⅛" to 3/16" is believed to be optimal. As disclosed herein, frame 16 defines a frame structure plane and has a shape to correspond with the shape of an outer surface profile of steam table pan 12.

To the opposing rails 18 and 20 are attached handles 30 and 32. Each of handles 18 and 20 exhibits paired, laterally spaced coupling segments 34 and 36 which extend substantially perpendicular from respective rails 18 and 20. At like-oriented, like angles to the laterally spaced segments 34 and 36 are respectively projecting rising segments 38 and 40. Extending between the digital termini of rising segments 38 and 40 of each of handles 30 and 32 is a handle or grasping segment 42.

In one embodiment of Applicants' invention, the handle segments 42 are enveloped with a suitable insulating material such as a heat resistant, rubber-like material (not shown in the drawings). In this manner, a user of the pan handler 10 will not be burned by virtue of the metal which forms the handle segments 42 becoming hot during its tenure at the steam table. Such rubber-like envelopments should be textured so as to promote secure grasping even by a user with wet or oily hands.

Most important of the design for the handles 30 and 32 are the size and orientation of the lateral segments 34 and 36. As shown in FIGS. 1 and 2, the lateral segments 34 and 36 should extend perpendicularly from the rails 18 and 20 substantially in the same plane defined by the frame 16. The lateral segments should be slightly longer than flange 14 is deep. By extending in the plane defined by the frame 16, the lateral segments 34 and 36 do not interfere with the proper seating of the pan 12 in its receptacle hole in the steam table (not shown in the drawings). The length of the lateral segments 34 and 36 is such that the rising segments 38 and 40 extend upward beyond the outer margin of the flange 14.

Use of the pan handler 10 is virtually fool-proof. The pan handler 10 is placed on a flat, level work surface, a steam table pan 12 is placed on the work surface within the bounds of the frame 16 and the user grasps the handles 30 and 32 raising the pan handler until it seats under the flange 14 of the pan 12 whereafter the pan 12 is carried to the steam table and lowered into the appropriate receptacle hole. Removing the pan 12 from the steam table and separating the pan handler 10 from the pan 12 is simply the reverse of this process.

By providing easily removable, yet highly utilitarian handles to steam table pans 12, the pan handler 10 satisfies each of the above-enumerated objectives of Applicants' invention. However, an alternative embodiment of Applicants' invention has substantial utility when one prefers to have a secure mating between a pan 12 and the pan handler 10.

FIGS. 3–5 show lid/pan clamps 50 installed in an alternative embodiment of the pan handling device 10. Lid/pan clamps 50 provide a means for securely engaging a pan handler 10 to a steam table pan 10, as well as for securing a steam table pan lid (not shown in the drawings) to the pan (such as when food is to be stored in a pan).

Each lid/pan clamp 50 comprises a cam lock 52 and a mounting bracket 54 to which cam lock 52 is rotatably attached by rivet 56.

FIGS. 5 and 6 show mounting bracket 54 includes a clasp portion 58 which is configured through standard metalworking procedures to snap about rails 18 or 20 of frame 16. As a continuation from clasp portion 58 extends a locking base portion 60 of mounting bracket. 54 against which cam lock 52 lodges the flange 14 of a pan 12 with or without a pan lid (not shown).

Finally, mounting bracket 54 continues from the locking base portion 60 as a cam support portion 62. Rivet 56 is affixed to cam support portion 62 to rotatably carry cam lock 52.

FIGS. 7a, 7b and 7c show the sequence of steps in engaging a steam table pan 12 with the pan handler 10 with pan/lid clamps 50 installed. Once the pan/lid clamps 50 are rotated into the operable position as shown in FIG. 7c, cam lock 52 is rotated to a point where flange 14 is securely lodged between cam lock 52 and locking base portion 60.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A device for handling a steam table pan having an inside recess for containing food, an outside surface profile, and an outward projecting flange that rests against a steam table top cover along the edge portion of a table pan-receiving hole when the outside surface profile of the steam table is registered with and disposed in the steam table pan-receiving hole, said device comprising:

a) table pan supporting means located along the outside surface profile of said steam table pan and below the outwardly projecting flange for carrying the steam table pan, b) said table pan supporting means being located between the outwardly projecting flange of the steam table pan and the steam table top cover along the edge portion of the steam table pan-receiving hole when the steam table pan is disposed in said steam table pan-receiving hole, and c) first and second handle means being connected to respective opposing sides of the table pan supporting means for lowering the steam table pan into and lifting said steam table pan out of a steam table pan-receiving hole.

2. A device as defined in claim 1 wherein said table pan supporting means includes flange engaging surface means and steam table cover engaging means, said flange engaging surface means being on one side of the table pan supporting means for contiguously supporting the outwardly projecting flange of the steam table pan, and said steam table cover engaging means being on another side of the table pan supporting means for resting on the steam table cover when the steam table pan is disposed within said table pan-receiving hole.

3. A device as defined in claim 1 wherein said table pan supporting means is effective to support the steam table pan at a position with respect to the heated water in the steam table that is not appreciably different from the position of the pan in the pan-receiving hole without the table pan supporting means.

4. A device as defined in claim 1 wherein said table pan supporting means includes an uninterrupted structural configuration that forms a gasket between the steam table cover and the outwardly projecting flange when the steam table pan is disposed in said steam table pan-receiving hole.

5. A device as defined in claim 4 wherein the uninterrupted structural configuration comprises metal stock and has a shape corresponding with the shape of an outer profile of said steam table pan.

6. A device as defined in claim 5 wherein the metal stock has a substantially round cross-section.

7. A device as defined in claim 6 wherein the metal stock has a cross-sectional diameter of approximately ¼ inch.

8. A device as defined in claim 1 wherein the table pan supporting means is removably disposable around the outside surface profile of said steam table pan.

9. A device as defined in claim 1 wherein the steam table pan has an upper margin defining an upper margin plane along the top of the inside surface of the steam table pan, and said table pan supporting means is located within said upper margin plane and under at least a portion of the outwardly projecting flange.

10. A device as defined in claim 1 wherein the table pan supporting means includes a frame structure defining a frame structure plane, and the first and second handle means each includes coupling segments fixedly secured at one end thereof to the frame structure, said coupling segments are located within said frame structure plane and have upwardly directed grasping handle sections at the other end thereof.

11. A device as defined in claim 1 wherein the table pan supporting means circumvents the entire outside surface profile of the steam table pan.

12. A device as defined in claim wherein the table pan supporting means includes gasket means located between the steam table cover and the outwardly projecting flange when the steam table pan is disposed in said steam table pan-receiving hole, said gasket means encircles the entire outside surface profile of the steam table pan.

13. A device as defined in claim 12 wherein the first and second handle means are connected to the gasket means.

14. A device as defined in claim 1 wherein clamping means is mounted to the table pan supporting means to securely engage the table pan supporting means to the steam table pan.

15. A device as defined in claim 14 wherein the clamping means includes mounting bracket means pivotally attached to said pan supporting means, said bracket means including a cam lock support portion, a locking base portion, and a cam lock, said cam lock being rotatably carried on said cam lock support portion to rotate between a locking position and an unlocked position.

16. A device for handling a steam table pan having an inside recess for containing food, an outside surface profile, and an outward projecting flange that rests against a steam table top cover along the edge portion of a table pan-receiving hole when the outside surface profile of the steam table is registered with and disposed in the steam table pan-receiving hole, said device comprising:

a) table pan supporting means including a frame structure for disposition along the outside surface profile of said steam table pan and below the outwardly projecting flange for carrying the steam table pan, b) said frame structure being located between the outwardly projecting flange of the steam table pan and the steam table top cover along the edge portion of the steam table pan-receiving hole when the device is in use and the steam table pan is disposed in said steam table pan-receiving hole, and c) first and second handle means disposed on respective opposing sides of the frame structure for lowering the steam table pan into and lifting said table pan out of a steam table pan-receiving hole.

17. A device as defined in claim 16 wherein the frame structure includes an uninterrupted structural configuration having a shape corresponding with the shape of an outer profile of said steam table pan.

18. A device as defined in claim 17 where in the uninterrupted structural configuration circumvents the entire outside profile of the steam table pan.

19. A device as defined in claim 18 wherein the uninterrupted structural configuration comprises a single ring member of metal stock, and the first and second handle means are mounted to said single ring member.

\* \* \* \* \*